(12) United States Patent
Romeo et al.

(10) Patent No.: US 11,992,947 B2
(45) Date of Patent: May 28, 2024

(54) METHOD OF CONTROLLING THE FORCE OF A PNEUMATIC ACTUATING DEVICE

(71) Applicant: CAMOZZI AUTOMATION S.P.A., Brescia (IT)

(72) Inventors: Rocco Antonio Romeo, Rome (IT); Daniele Pucci, Genoa (IT); Luca Fiorio, Cuneo (IT); Marco Rossi, Brescia (IT)

(73) Assignee: UFI FILTERS S.P.A., Porto Mantovano (IT)

( * ) Notice: Subject to any disclaimer, the term of this patent is extended or adjusted under 35 U.S.C. 154(b) by 245 days.

(21) Appl. No.: 17/772,774

(22) PCT Filed: Oct. 30, 2020

(86) PCT No.: PCT/IB2020/060205
§ 371 (c)(1),
(2) Date: Apr. 28, 2022

(87) PCT Pub. No.: WO2021/084493
PCT Pub. Date: May 6, 2021

(65) Prior Publication Data
US 2022/0395976 A1 Dec. 15, 2022

(30) Foreign Application Priority Data
Oct. 31, 2019 (IT) .................. 102019000020156

(51) Int. Cl.
*B25J 15/12* (2006.01)
*B25J 9/16* (2006.01)
*B25J 15/02* (2006.01)

(52) U.S. Cl.
CPC ........... *B25J 9/1653* (2013.01); *B25J 9/1612* (2013.01); *B25J 9/163* (2013.01); *B25J 9/1633* (2013.01); *B25J 15/0206* (2013.01)

(58) Field of Classification Search
CPC ........ B25J 9/1653; B25J 9/1612; B25J 9/163; B25J 9/1633; B25J 15/0206; F15B 11/8855; F15B 2211/6313
See application file for complete search history.

(56) References Cited

U.S. PATENT DOCUMENTS

| 5,448,146 A | 9/1995 | Erlbacher |
| 7,210,394 B2 * | 5/2007 | Yajima .................. F15B 11/044 60/368 |

(Continued)

OTHER PUBLICATIONS

International Search Report and Written Opinion of the International Searching Authority for International Patent Application No. PCT/IB2020/060205 dated Feb. 9, 2021, 7 pages.

(Continued)

*Primary Examiner* — Dalena Tran
(74) *Attorney, Agent, or Firm* — Merchant & Gould P.C.

(57) ABSTRACT

A method is for controlling an actuation force exerted by an actuating device having a first working chamber and a second working chamber supplied with pressurized air from a source of pressurized air by a first pressure regulator and a second pressure regulator. The method includes calculating, by an optimization algorithm based on a dynamic model of the actuating device and of the first and second pressure regulators, desired values for control signals for the first and second pressure regulators to generate an actuation force equal to a desired value for the actuation force. An estimated value for the actuation force, estimated values for pressures inside the first and second working chambers and for first derivatives of the pressures, are determined by a state observer based on a measured value for the actuation force and on measured values for the pressures in the first and second working chambers.

4 Claims, 2 Drawing Sheets

(56) References Cited

U.S. PATENT DOCUMENTS

| | | | |
|---|---|---|---|
| 8,146,481 B2* | 4/2012 | Hoshino | F15B 21/08 |
| | | | 60/459 |
| 8,301,276 B2* | 10/2012 | Tautz | F15B 9/09 |
| | | | 700/282 |
| 8,301,307 B2 | 10/2012 | Paulus et al. | |
| 8,375,842 B2* | 2/2013 | Kolbenschlag | F15B 11/08 |
| | | | 91/361 |
| 9,546,672 B2* | 1/2017 | Perkins | F15B 15/28 |
| 2011/0120296 A1 | 5/2011 | Hoshino et al. | |
| 2019/0145083 A1 | 5/2019 | Rausch et al. | |

OTHER PUBLICATIONS

Ottaviano, E. et al., "Grasp Force Control in Two-Finger Grippers with Pneumatic Actuation", Proceedings of the 2000 IEEE International Conference on Robotics & Automation, 1976-1981 (Apr. 2000).

* cited by examiner

METHOD OF CONTROLLING THE FORCE OF A PNEUMATIC ACTUATING DEVICE

CROSS-REFERENCE TO RELATED APPLICATIONS

This application is a National Stage Application of PCT/IB2020/060205, filed 30 Oct. 2020, which claims benefit of Serial No. 102019000020156, filed 31 Oct. 2019 in Italy and which applications are incorporated herein by reference. To the extent appropriate, a claim of priority is made to each of the above disclosed applications.

FIELD OF THE INVENTION

The present invention relates to a method for controlling the force of a pneumatic actuating device, such as a gripping device (commonly known as a "gripper").

Although the invention will be described and illustrated here with particular reference to the application thereof to a gripping device, such as a pneumatic actuating device, it is equally applicable to a pneumatic cylinder.

BACKGROUND OF THE INVENTION

Pneumatic actuating devices have been in use for decades. In gripping devices in particular, pneumatic gripping devices have a series of advantages compared with electric gripping devices, in particular the fact that they are less expensive and more compact, the ability to apply high forces that travel very short distances and the fact that they are not subjected to overheating when they are actuated for long periods of time.

The present invention proposes overcoming the problem of controlling the force applied by a pneumatic actuating device, or, in a gripping device, the gripping force generated by the device. Controlling the force applied by pneumatic actuating devices, such as gripping devices, is by no means trivial, since the force applied by the device is dependent on the air pressure in the working chambers of said device. Therefore, even today it is far from easy to produce closed-loop control systems for controlling the force exerted by pneumatic actuating devices.

A system for controlling the force applied to pneumatic gripping devices is known from the paper "*Grasp force control in two finger grippers with pneumatic actuation,*" Proceedings of ICRA 2000, vol. 2, pages 1976-1981, 2000, authors: E. Ottaviano, M. Toti and M. Ceccarelli. This known control system is based on the use of a proportional-integral controller (PI) and a force sensor for performing feedback control of the gripping force applied by the device.

U.S. Pat. No. 8,301,307 discloses a method and a system for controlling the force exerted by a pneumatic cylinder, which perform feedback control on the basis of the size of the force supplied by a force sensor.

A method for controlling the force applied by a pneumatic cylinder is also known from U.S. Pat. No. 5,448,146. In this case, the control method is designed to regulate the force exerted by the pneumatic cylinder at a constant value.

SUMMARY OF THE INVENTION

The object of the present invention is to improve the control of the force applied by a pneumatic actuating device with respect to the prior art described above.

This and other objects are achieved by a control method as described and claimed herein.

Advantageous embodiments of the method according to the present invention are also described.

In summary, the invention is based on the idea of using, to control the force applied by the device, a dynamic model of the actuating system (in which, for an actuating system, this collectively means the actuating device and the relative pneumatic control circuit, which pneumatic control circuit comprises a pressurized air supply and a pair of pressure regulators each associated with a particular working chamber of the actuating device in order to regulate the pressure of the air inside this chamber), and an optimization algorithm designed to calculate optimized values for the control signals (for example voltage signals) supplied to the pressure regulators in order to control the force applied by the actuating device, in which the optimization algorithm is continuously supplied with estimated values for the pressures in the working chambers of the actuating device, which values are provided by the respective pressure regulators, and with estimated values for the derivatives of these pressures, and in which the above-mentioned estimated values for the pressures and for the relative derivatives are estimated in real time by a state observer that receives the input values measured for the force applied by the device and of the pressures in the working chambers of the device on one hand, and, on the other hand, the values for the control signals for the pressure regulators (and therefore the desired values for the pressures that have to be applied by the pressure regulators), which are calculated by the optimization algorithm.

Due to the fact that the control method uses a dynamic model of the pressure regulators, it is possible to optimize the control of the pressures applied by the pressure regulators in the working chambers of the actuating device. In particular, the use of a dynamic model for controlling the actuating device makes it possible to ensure that the control system is stable and to offer effective tracking performance for desired time-variable values, as well as effective management of the transistors.

Furthermore, the use of an optimization algorithm makes it possible to minimize the energy consumption by generating the minimum pressures that allow the desired force to be reached, as well as to easily manage restrictions on the model (for example limits on the pressure values) and dynamics that are also very complex.

When the actuating device is a gripping device, the independent control of the pressures in the working chambers of the actuating device then make it possible to open the device, that is to move the fingers of the device away from one another when the desired force is zero.

Furthermore, due to the fact that the control method uses a state observer to estimate the pressures in the working chambers of the actuating device, it is possible to estimate the derivatives of the pressures without the need to numerically calculate these derivatives.

BRIEF DESCRIPTION OF THE FIGURES

Additional features and advantages of the present invention will become clear from the following detailed description, given purely by way of non-limiting example, with reference to the attached drawings, in which.

DETAILED DESCRIPTION

Figure 1:
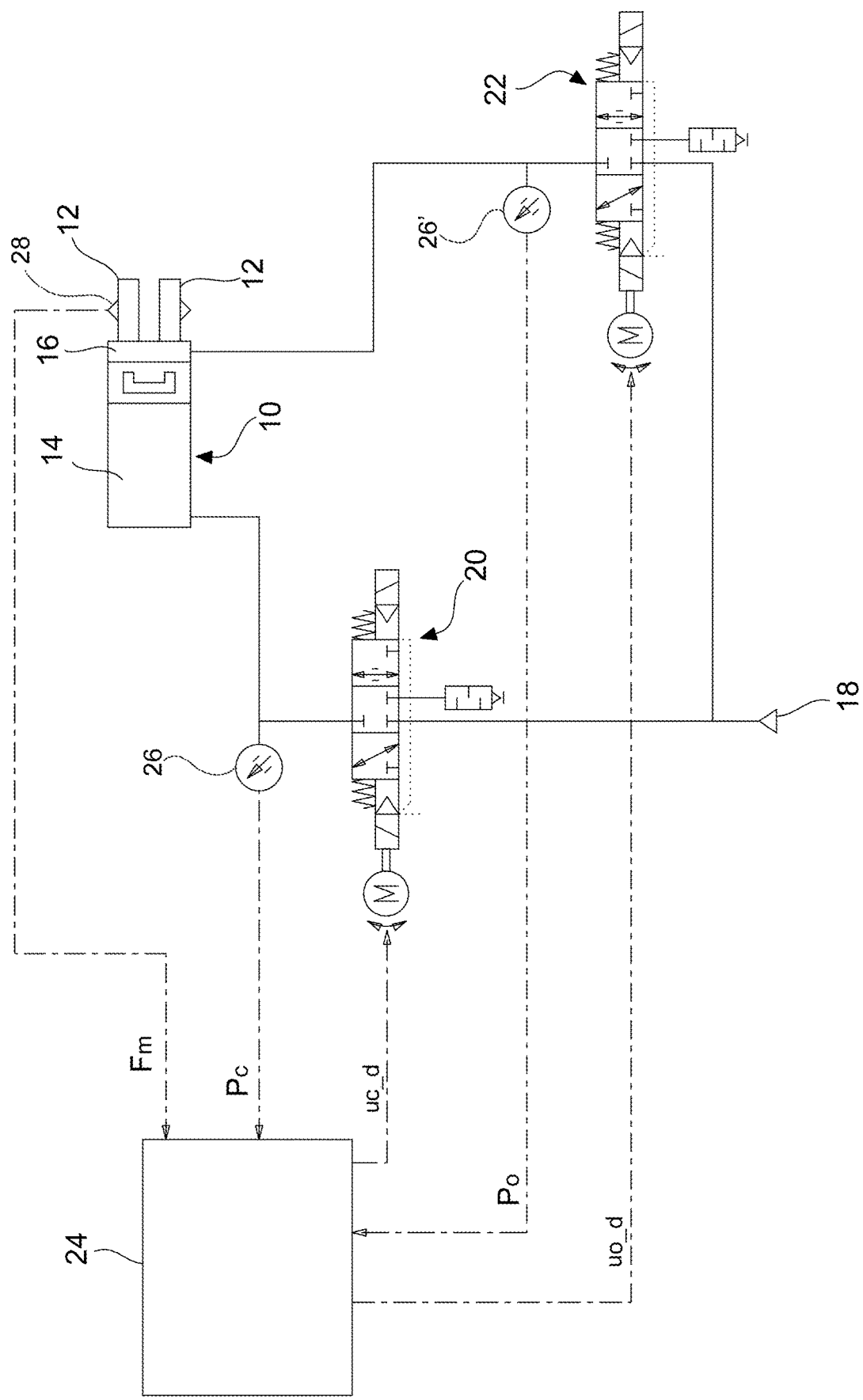
FIG. 1 is a schematic view of a pneumatic actuating system to which the control method of the present invention may be applied.

Referring initially to FIG. 1, a pneumatic actuating system first of all comprises an actuating device 10 (which is designed as a gripping device in the present case, but which—as mentioned—could be designed as an actuating cylinder), having at least one actuating member 12 intended for generating an output actuation force. The actuating device 10 comprises a first working chamber 14 and a second working chamber 16 that may be supplied with pressurized air in order to control the movement of the actuating member (or members) 12 with a given actuation force that is dependent on the pressures in the working chambers.

In the specific case of an actuating device 10 designed as a gripping device, the device comprises two actuating members 12 acting as gripping fingers (and therefore indicated as "gripping fingers" from here onwards for the sake of simplicity), which may alternately be moved towards one another in order to tighten an object to be grasped with a given force (indicated as the "gripping force" from here onwards) or moved away from one another in order to release the grasped object. By supplying pressurized air to the first working chamber 14, the movement of the gripping fingers 12 towards one another, and therefore the grasping of the object, is controlled, while, by supplying pressurized air to the second working chamber 16, the movement of the gripping fingers 12 away from one another, and therefore the release of the object, is controlled. Therefore, the first and the second working chamber 14 and 16 will also be indicated in the present description as the closing chamber and as the opening chamber, respectively, and the relative variables (for example the pressure) will be indicated by the subscript "c" and by the subscript "o," respectively. By modulating the pressures in the first working chamber 14 (closure chamber) and in the second working chamber 16 (opening chamber), it is therefore possible to open/close the gripping fingers 12 of the actuating device 10 and to change the gripping force.

The pneumatic actuating system also comprises a pressurized air supply (or an air compressor) 18 and a pair of pressure regulators 20 and 22 each arranged between the pressurized air supply 18 and a particular working chamber 14 and 16 of the actuating device 10, and specifically a first pressure regulator 20 arranged between the pressurized air supply 18 and the first working chamber 14 in order to supply this chamber with pressurized air at a given regulatable pressure, and a second pressure regulator 22 arranged between the pressurized air supply 18 and the second working chamber 16 in order to supply this chamber with pressurized air that is at a given regulatable pressure. Each pressure regulator 20 and 22 receives an input control signal, for example a voltage signal (but which could also be a different type of signal, such as a current signal), and, on the basis of this control signal, determines the pressure of the air in the particular working chamber (first working chamber 14 for the first pressure regulator 20 and second working chamber 16 for the second pressure regulator 22) of the actuating device 10.

The pneumatic actuating system further comprises an electronic control unit 24 designed to suitably control the pressure regulators 20 and 22 on the basis of information received from respective pressure sensors 26 and 26' regarding the values for the pressures in the working chambers 14 and 16 of the actuating device 10 and from a force sensor 28 (for example a load cell) regarding the force applied by the actuating device 10 (in the present case, the gripping force generated by the gripping fingers 12), in order to ensure the application of a given actuation force.

Although in the schematic view in FIG. 1, the pressure regulators 20 and 22, the pressure sensors 26, 26' and the electronic control unit 24 are shown as separate components with respect to the actuating device 10, an embodiment that provides the integration of the above-mentioned components inside the actuating device 10 should also be understood to be covered by the scope of the present invention.

Figure 2:
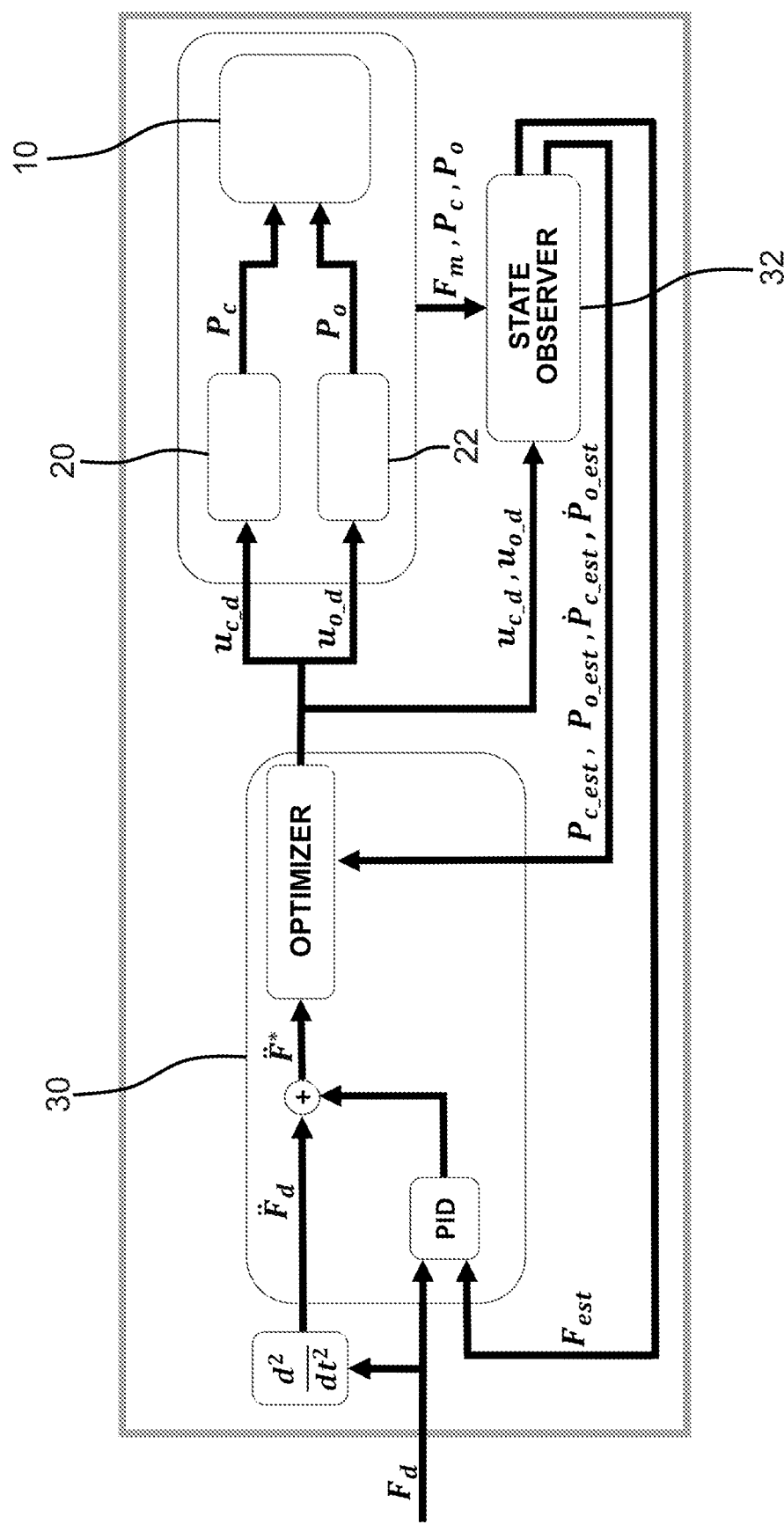
FIG. 2 is a block diagram of the pneumatic actuating system in FIG. 1.

FIG. 2 is a block diagram of the actuating system, which shows that the electronic control unit 24 comprises a controller 30 and a state observer 32 and that the controller 30 is a closed-loop proportional-integral-derivative (PID) controller associated with an optimizer implementing an optimization algorithm. In this figure:

$F_d$, $F_m$ and $F_{est}$ respectively indicate the desired actuation force (gripping force) value, the actuation force value measured by the force sensor 28 and the actuation force value estimated by the state observer 32;

$P_c$, $P_o$, $P_{c\_est}$ and $P_{o\_est}$ respectively indicate the value for the pressure in the first working chamber 14 measured by the pressure sensor 26, the value for the pressure in the second working chamber 16 measured by the pressure sensor 26', the value for the pressure in the first working chamber 14 estimated by the state observer 32 and the value for the pressure in the second working chamber 16 estimated by the state observer 32; and $u_{c\_d}$ and $u_{o\_d}$ respectively indicate the desired values for the control voltages (assuming that the control signals for the pressure regulators 20 and 22 are voltage signals), as calculated by the controller 30, which values are to be sent to the first pressure regulator 20 and to the second pressure regulator 22.

On the basis of the desired actuation force value $F_d$ supplied as it enters the system, of the estimated actuation force value $F_{est}$ supplied by the state observer 32 and of the estimated values $P_{c\_est}$ est and $P_{o\_est}$ for the pressures in the working chambers 14 and 16, as well as for the relative first derivatives, supplied by the state observer 32, the controller 30 determines the desired values $u_{c\_d}$ and $u_{o\_d}$ for the control voltages to be supplied to the first pressure regulator 20 and to the second pressure regulator 22, respectively.

The state observer 32 determines the above-mentioned estimated values $F_{est}$, $P_{c\_est}$ and $P_{o\_est}$ for the actuation force and the pressures in the working chambers 14 and 16, and for the first derivatives $\dot{P}_{c\_est}$ est and $\dot{P}_{o\_est}$ of the second two estimated values, on the basis of the values $F_m$, $P_c$ and $P_o$ measured for the actuation force and for the pressures in the working chambers 14 and 16, as well as for the desired values $u_{c\_d}$ and $u_{o\_d}$ for the control voltages.

The controller 30 and the state observer 32 integrate a dynamic model of the actuating device 10 and of the pressure regulators 20 and 22 associated therewith.

More specifically, the mathematical model of the pressure regulators 20 and 22 is given by the following equation, which describes the dynamic behavior of the i-th pressure regulator, where i=c for the first pressure regulator 20 and i=o for the second pressure regulator 22:

$$\ddot{P}_i = K_{P_i}P_i^2 + K_{PP_i}P_i^2 + K_{D_i}\dot{P}_i^2 + K_{DD_i}\dot{P}_i^2 + K_{PD_i}P_i\dot{P}_i + (B_{U_i} + B_{PP_i}P_i + B_{D_i}\dot{P}_i)u_ic_i \quad (1)$$

Equation (1) herein above approximates the second derivative of the pressure $P_i$ regulated by the i-th pressure regulator with a great degree of precision on the basis of the control voltage $u_i$ supplied to this pressure regulator. The parameters $K_{P_i}$, $K_{PP_i}$, $K_{D_i}$, $K_{DD_i}$, $B_{U_i}$, $B_{PP_i}$, $B_{D_i}$ and $c_I$ may be determined empirically by means of an iterative process.

With regard to the actuating device 10, the actuation force (gripping force) F applied thereby is given by the equation $$F = AP + b,$$

where $A = [-a_1 \ a_2]$ (calibration coefficient), $P = [P_c P_o]^T$ and b is a parameter that may be estimated empirically.

The second derivative of the actuation force F is given by the following equation:

$$\ddot{F} = \bar{\gamma} + Cu, \qquad (3)$$

where $$\bar{\gamma} = \delta(K_P P_c + K_{PP} P_c^2 + K_D \dot{P}_c + K_{DD} \dot{P}_c^2 + K_{PD} P_c \dot{P}_c + c + \alpha(K_P P_o + K_{PP} P_o^2 + K_D \dot{P}_o + K_{DD} P_o^2 K_{PD} P_o \dot{P}_o + c, \text{ and} \qquad (4)$$

$$C = \delta[B_U + B_{PP} P_c + B_D \dot{P}_c, \alpha(B_U + B_{PP} P_o + B_D \dot{P}_o)]. \qquad (5)$$

In equations (4) and (5) given above, the 6 factor coincides with the above-mentioned A vector.

Equation (4) given above is based on the assumption that the above-mentioned parameters $K_{P_i}$, $K_{PP_i}$, $K_{D_i}$, $K_{DD_i}$, $B_{U_i}$, $B_{PP_i}$, $B_{D_i}$ and $c_i$ of Equation (1) are the same for the two pressure regulators 20 and 22 used to control the actuating device 10. However, this assumption is not binding, since the control method of the present invention may also function with different values for these parameters for the two pressure regulators 20 and 22.

The law of control used by the controller 30, which is a closed-loop PID controller as mentioned, is given by the following equation:

$$\ddot{F}^* = \ddot{F}_d - K_p^{-1}(F - F_d) - K_i^{-1}\int(F - F_d)dt - K_d^{-1}(\dot{F} - \dot{F}_d). \qquad (6)$$

The controller 30 is designed to minimize the norm of the u vector $= [u_{c\_d} u_{o\_d}]$, taking into consideration that the second derivative of the actuation force expressed by Equation (3) has to be equal to the termon the right of Equation (6). As a result, at each iteration, the controller 30 provides the desired output values $u_{c\_d}$ and $u_{o\_d}$ for the control voltages for the pressure regulators 20 and 22 calculated by implementing the above-mentioned optimization algorithm, which is based precisely on minimizing the norm of the above-mentioned u vector.

Experiments have proven that the control method described above makes it possible to control the force applied by the actuating device with great precision, with an error between the desired force and the force actually applied of less than 1 N (with respect to forces in the tens of N).

As mentioned previously, in addition to the advantage of ensuring a very low error risk, the control method according to the invention offers the advantage of minimizing the energy consumption on account of carrying out an optimization calculation that makes it possible to determine the minimum pressures to be imposed in the working chambers of the actuating device in order to generate the desired force.

Furthermore, the control method according to the invention makes it possible to obtain better performance with respect to a classic PID controller, as well as with respect to the known control methods cited above, in particular when tracking time-variable signals and managing the transistors.

Without prejudice to the principle of the invention, the embodiments may be extensively modified with respect to that which has been described and illustrated purely by way of non-limiting example, without thereby departing from the scope of the invention, as defined in the attached claims.

For example, as already mentioned previously, although the control method has been described and illustrated here with specific reference to the application thereof to a gripping device, such as a pneumatic actuating device, it is equally applicable to a pneumatic cylinder. In fact, in a pneumatic cylinder, too, there will be two working chambers, the pressures of which are regulated by respective pressure regulators in order to determine the extension or retraction of a rod acting as an actuation member and the control method will make it possible to control the compressive or tensile force exerted by the rod in this case.

The invention claimed is:

1. A method for controlling an actuation force exerted by a pneumatic actuating device,
   wherein the pneumatic actuating device comprises a first working chamber and a second working chamber configured to be supplied with pressurized air by a source of pressurized air through a first pressure adjuster and a second pressure adjuster, respectively, and
   wherein said first pressure adjuster and second pressure adjuster are configured to adjust pressure of air inside the first and second working chambers, respectively, depending on a control signal,
   the method comprising iterative real-time implementation of steps of:
   a) calculating, by an optimization algorithm based on a dynamic model of the pneumatic actuating device and of said first and second pressure adjusters, desired values for control signals for said first and second pressure adjusters to generate, by the pneumatic actuating device, an actuation force equal to a desired value for the actuation force, calculation being carried out by a closed-loop proportional-integral-derivative controller based on the desired value for the actuation force, on an estimated value for the actuation force and on estimated values for pressures in said first and second working chambers and for first derivatives of said pressures, and
   b) establishing, by a state observer, the estimated value for the actuation force, the estimated values for the pressures in said first and second working chambers and for the first derivatives of said pressures, based on a measured value for the actuation force and on measured values for the pressures in said first and second working chambers.

2. The method of claim 1, wherein, in step b) the estimated value for the actuation force, the estimated values for the pressures in said first and second working chambers and for the first derivatives of said pressures, are established by also taking into account the desired values for the control signals calculated in step a).

3. The method of claim 1, wherein the desired values for the control signals for said first and second pressure adjusters calculated in step a) are established to minimize the norm of vector of the control signals for said first and second pressure adjusters.

4. A pneumatic actuating system, comprising:
   a pneumatic actuating device configured to apply an actuation force, the pneumatic actuating device comprising at least one movable actuating member a first working chamber and a second working chamber configured to be supplied with pressurized air to control movement of said at least one movable actuating member, a source of pressurized air, a first pressure adjuster interposed between said source of pressurized air and said first working chamber to supply said first working chamber with pressurized air at a given adjustable pressure, a second pressure adjuster interposed between said source of pressurized air and said second working chamber to supply said second working chamber with pressurized air at a given adjustable pressure, pressure sensors configured to provide signals indicative of the actuation force exerted by the pneumatic actuating device by said at least one movable actuating member, and signals indicative of pressures in said first and second working chambers, and an electronic control unit configured to control said first and second pressure adjusters by performing the method of claim 1.

\* \* \* \* \*